(12) United States Patent
Nonaka et al.

(10) Patent No.: US 11,148,178 B2
(45) Date of Patent: Oct. 19, 2021

(54) ULTRASONIC CLEANER AND AUTOMATIC ANALYZER USING THE SAME

(71) Applicant: HITACHI HIGH-TECHNOLOGIES CORPORATION, Tokyo (JP)

(72) Inventors: Kohei Nonaka, Tokyo (JP); Tetsuji Kawahara, Tokyo (JP); Takamichi Mori, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 228 days.

(21) Appl. No.: 16/468,006

(22) PCT Filed: Nov. 28, 2017

(86) PCT No.: PCT/JP2017/042593
§ 371 (c)(1),
(2) Date: Jun. 10, 2019

(87) PCT Pub. No.: WO2018/116759
PCT Pub. Date: Jun. 28, 2018

(65) Prior Publication Data
US 2020/0009619 A1 Jan. 9, 2020

(30) Foreign Application Priority Data

Dec. 20, 2016 (JP) .............................. JP2016-246331

(51) Int. Cl.
*B08B 3/12* (2006.01)
*B08B 3/14* (2006.01)
*G01N 35/10* (2006.01)

(52) U.S. Cl.
CPC .................. *B08B 3/12* (2013.01); *B08B 3/14* (2013.01); *G01N 35/1002* (2013.01); *G01N 35/1004* (2013.01)

(58) Field of Classification Search
CPC ........ B08B 3/12; B08B 3/14; G01N 35/1002; G01N 35/1004
(Continued)

(56) References Cited

U.S. PATENT DOCUMENTS

| 2006/0002824 A1* | 1/2006 | Chang ................... B01L 3/0293 422/400 |
| 2013/0233342 A1* | 9/2013 | Bran ......................... B06B 3/00 134/1.3 |
| 2018/0161829 A1 | 6/2018 | Horie et al. |

FOREIGN PATENT DOCUMENTS

| GB | 2538964 A * 12/2016 ............... B08B 3/12 |
| JP | 60-042635 A 3/1985 |

(Continued)

OTHER PUBLICATIONS

JPH049670A—Machine translation (Year: 1992).*
(Continued)

*Primary Examiner* — Tinsae B Ayalew
(74) *Attorney, Agent, or Firm* — Mattingly & Malur, PC

(57) ABSTRACT

To suppress precipitation of a cleaning solution to a vibration head of an ultrasonic cleaner. An ultrasonic cleaner includes: a cleaning tank which stores a cleaning solution; an ultrasonic transducer; and a vibration head which extends from the ultrasonic transducer toward the cleaning tank and of which a tip portion includes a cylindrical hole having a longitudinal direction aligned to a vertical direction, wherein the ultrasonic transducer is driven at a frequency at which the vibration head is vibrated resonantly, and wherein the vibration head is provided with a hydrophobic or hydrophilic coating film 502 which has an interface between an area 223 corresponding to a vibration antinode and area corresponding to a vibration node during the resonant vibra-
(Continued)

tion of the vibration head, and covers the area 222 corresponding to the vibration node.

10 Claims, 7 Drawing Sheets

(58) Field of Classification Search
USPC .......................................................... 134/184
See application file for complete search history.

(56) References Cited

FOREIGN PATENT DOCUMENTS

| JP | 04-9670 A | 1/1992 |
| JP | 04-169850 A | 6/1992 |
| JP | 2008-505345 A | 2/2008 |
| WO | 9814985 A1 | 4/1998 |
| WO | 2017/002740 A1 | 1/2017 |

OTHER PUBLICATIONS

Extended European Search Report of Application No. 17883259.8 dated Jul. 13, 2020.
International Search Report of PCT/JP2017/042593 dated Feb. 27, 2018.

\* cited by examiner

ULTRASONIC CLEANER AND AUTOMATIC ANALYZER USING THE SAME

TECHNICAL FIELD

The present invention relates to an ultrasonic cleaner for cleaning a sample probe which dispenses such sample as serum and urine, and an automatic analyzer provided with the ultrasonic cleaner for conducting component analysis of a sample-reagent mixture.

BACKGROUND ART

As the automatic analyzer is configured to dispense the sample by using the same sample probe repeatedly, the tip portion of the sample probe is cleaned before suction of another sample. Insufficient cleaning of the tip portion of the sample probe leads to carry-over of the component of the previously dispensed sample into the next sample, resulting in deteriorated measurement accuracy. The automatic analyzer with high throughput performance is configured to execute the high-speed dispensing process, thus hardly allowing sufficient time for cleaning the sample probe. Patent Literature 1 discloses the use of the ultrasonic cleaner having a langevin type vibrator disposed on the bottom of the cleaning tank so as to remove the sample adhering to the nozzle by utilizing cavitation generated in the liquid.

CITATION LIST

Patent Literature

PTL 1: Japanese Unexamined Patent Application Publication No. Hei 4-169850

SUMMARY OF INVENTION

Technical Problem

In most cases, the cleaner utilizing ultrasonic wave is used to clean out the stain hard to be removed by setting the drive frequency of the ultrasonic transducer to the low frequency (20 to 100 kHz). The low-frequency cleaning is achieved by utilizing cavitation (phenomenon of generation/disappearance of bubbles owing to pressure difference in the liquid) generated in the liquid. The cavitation is not necessarily generated uniformly in the liquid. The magnitude of cavitation may vary with the ultrasonic intensity. The interval of generating the region with high ultrasonic intensity differs depending on the driving frequency. The area with great magnitude of cavitation is generated at the interval of the distance obtained by dividing the sound velocity of the liquid (in the case of water, approximately 1500 m/s) by the drive frequency of the ultrasonic transducer. For example, in driving at the frequency of 50 kHz, a standing wave at 30 mm ($\lambda$)/wavelength is generated. The region with great magnitude of cavitation is generated at the interval of 15 mm ($\lambda/2$) as the semi-wave length. The area around the vibrating surface where ultrasonic waves are generated becomes the one with the great magnitude of cavitation.

When driving the ultrasonic cleaner having the langevin type vibrator disposed on the lower part of the cleaning tank as disclosed in Patent Literature 1 at the frequency ranging from 20 to 100 kHz for obtaining the cavitation effect, the region with the great magnitude of cavitation is generated at the interval ranging from 7.5 mm (driven at 100 kHz) to 37.5 mm (driven at 20 kHz). The magnitude of cavitation becomes greater as it becomes closer to the vibrator as the drive source. Because of narrow range of the region where the magnitude of cavitation becomes greater, the sample probe cleaning range is limited, thus easily causing the cleaning unevenness. Furthermore, the ultrasonic cleaner configured to have the vibrator disposed on the lower part of the cleaning tank generates ultrasonic waves in the liquid stored inside by excitation of the bottom part of the stainless steel tank, resulting in the large bottom area. Consequently, the present invention is configured to dispose the vibration head at the tip portion of the langevin type vibrator, and vibrate the vibration head resonantly around the liquid surface so as to achieve a large displacement.

The cleaning operation includes two main types, the cleaning performed by utilizing chemical effects of the cleaning solution, and the cleaning performed by utilizing physical effects such as the cavitation and straight flows. In order to obtain great cleaning effects, it is preferable to effectively utilize both effects as described above. The vibration source having a large amplitude disposed near the liquid surface may cause a rising liquid level. The rising cleaning solution reaches the surface having a small amplitude. If the cleaning solution exhibits the property that is likely to be precipitated, the liquid may be precipitated on the interface of the rising liquid. As the surface where the precipitation has occurred has the small amplitude, it is impossible to remove the precipitated liquid. The precipitated substance will be made swollen with the lapse of time. Assuming that the precipitated substance is mixed into the sample container or the reaction cell, it may interfere with the sample analysis.

Solution to Problem

The ultrasonic cleaner according to the present invention includes a cleaning tank which stores a cleaning solution, an ultrasonic transducer, and a vibration head which extends from the ultrasonic transducer toward the cleaning tank and of which a tip portion includes a cylindrical hole having a longitudinal direction aligned to a vertical direction. The ultrasonic transducer is driven at a frequency at which the vibration head is vibrated resonantly. The vibration head is provided with a hydrophobic or hydrophilic coating film which has an interface between an area corresponding to a vibration antinode and an area corresponding to a vibration node during the resonant vibration of the vibration head, and covers the area corresponding to the vibration node.

The automatic analyzer has the above-described ultrasonic cleaner installed therein.

Advantageous Effects of Invention

The ultrasonic cleaner is configured to suppress precipitation of the cleaning solution onto the vibration head so as to facilitate maintenance work in the long-term use.

DESCRIPTION OF EMBODIMENT

Figure 1:
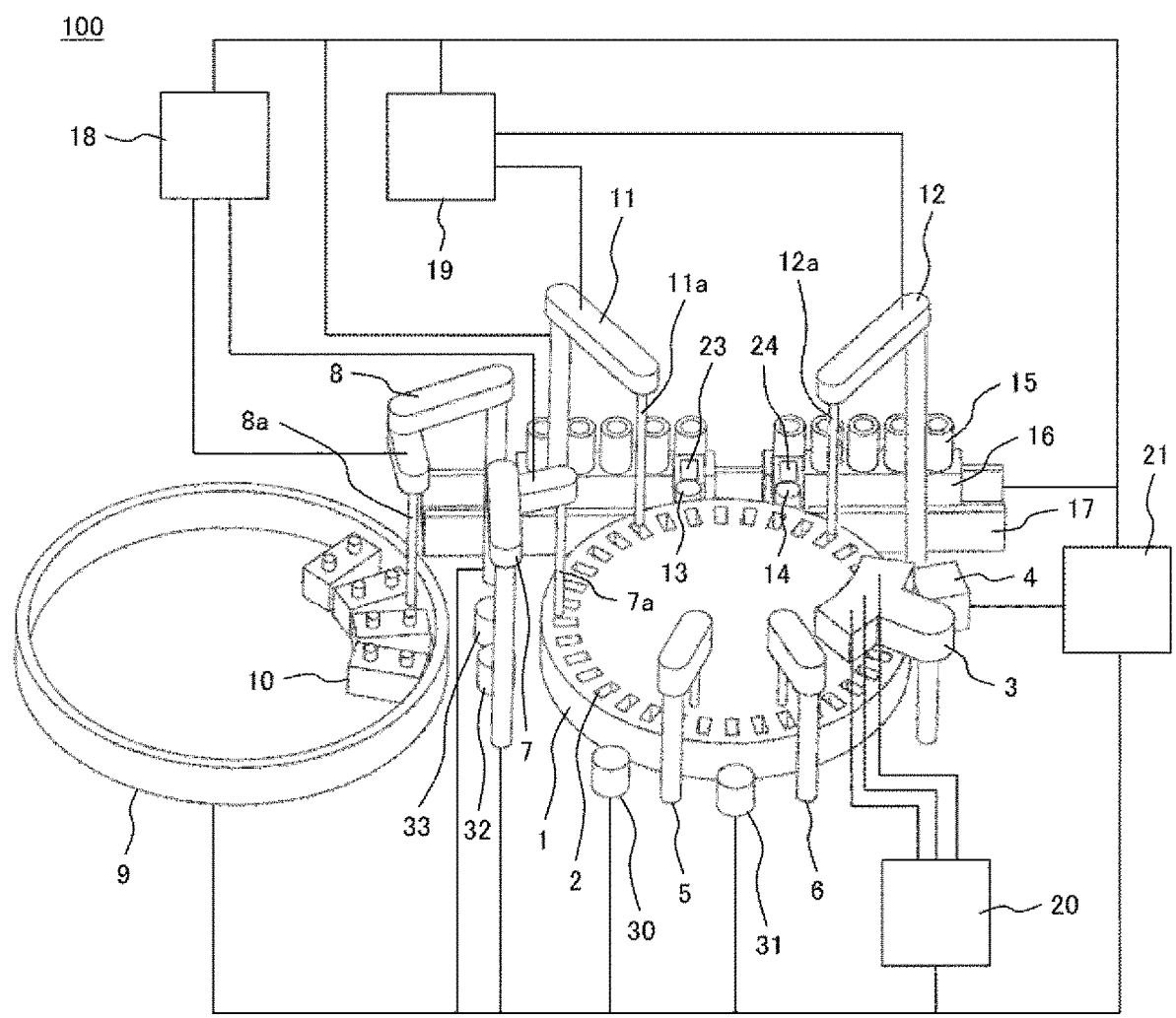
FIG. 1 is a schematic diagram of an automatic analyzer.

An embodiment according to the present invention will be described in detail referring to the drawings.

FIG. 1 is a schematic diagram of an automatic analyzer 100. The biological sample to be analyzed such as blood and urine (hereinafter simply referred to as a sample) is stored in a sample container 15. One or more sample containers 15 are mounted on a sample rack 16, and transferred by a sample transfer mechanism 17. A reagent used for sample analysis is stored in a reagent bottle 10. Multiple reagent bottles 10 are circumferentially arranged on a reagent disk 9. The sample and the reagent are mixed for reaction in a reaction vessel 2. Multiple reaction vessels 2 are circumferentially arranged on a reaction disk 1. The sample container 15 is transferred to a sample dispensing position by the sample transfer mechanism 17. Then the sample is dispensed from the sample container 15 to the reaction vessel 2 by a first or a second sample dispensing mechanism 11 or 12. Meanwhile, the reagent is dispensed from the reagent bottle 10 to the reaction vessel 2 by reagent dispensing mechanisms 7, 8. A mixture liquid (reaction liquid) of the sample and the reagent which have been dispensed to the reaction vessel 2 is stirred by stirring mechanisms 5, 6. The transmitted light from a not shown light source through the reaction liquid in the reaction vessel 2 is measured by a spectrophotometer 4 so that absorbance of the reaction liquid is measured. The automatic analyzer 100 executes an analysis process by calculating the predetermined constituent concentration of the analysis item corresponding to the reagent in accordance with the absorbance of the mixture liquid (reaction liquid) measured by the spectrophotometer 4. The measured reaction vessel 2 is cleaned by a cleaning mechanism 3.

The first (second) sample dispensing mechanism 11 (12) includes a sample probe 11a (12a) which is disposed having its tip portion directed downward. A sample pump 19 is connected to the sample probe 11a (12a). The first (second) sample dispensing mechanism 11 (12) is structured to be horizontally rotated, and vertically operated so that the sample probe 11a (12a) is inserted into the sample container 15 for suction of the sample, and inserted into the reaction vessel 2 for discharging the sample. The sample is then dispensed from the sample container 15 to the reaction vessel 2. An ultrasonic cleaner 23 (24) for cleaning the sample probe 11a (12a) with cleaning solution is disposed in an operation range of the first (second) sample dispensing mechanism 11 (12). A cleaning tank 13 (14) is disposed for cleaning the sample probe 11a (12a) so that the cleaning solution other than water is washed out with water.

The reagent dispensing mechanisms 7, 8 include reagent probes 7a, 8a, respectively each tip portion of which is directed downward. A reagent pump 18 is connected to the reagent probes 7a, 8a. The reagent dispensing mechanisms 7, 8 are structured to be horizontally rotated, and vertically operated so that the sample probes 7a, 8a are inserted into the reagent bottles 10 for suction of the reagent, and inserted into the reaction vessels 2 for discharging the sample. The sample is then dispensed from the reagent bottle 10 to the reaction vessel 2. Cleaning tanks 32, 33 for cleaning the sample probes 7a, 8a with the cleaning solution are disposed in operation ranges of the reagent dispensing mechanisms 7, 8, respectively.

The stirring mechanisms 5, 6 are structured to be horizontally rotated, and vertically operated. They are inserted into the reaction vessel 2 so that the mixture liquid (reaction liquid) of the sample and the reagent is stirred. Cleaning tanks 30, 31 for cleaning the stirring mechanisms 5, 6 with the cleaning solution are disposed in operation ranges of the stirring mechanisms 5, 6. A cleaning pump 20 is connected to the cleaning mechanism 3.

Overall operations of the automatic analyzer 100 are controlled by a control unit 21. FIG. 1 omits a connection portion between the respective mechanisms and the control unit 21 which constitute the automatic analyzer 100 for simplifying the illustration.

Figure 2A:
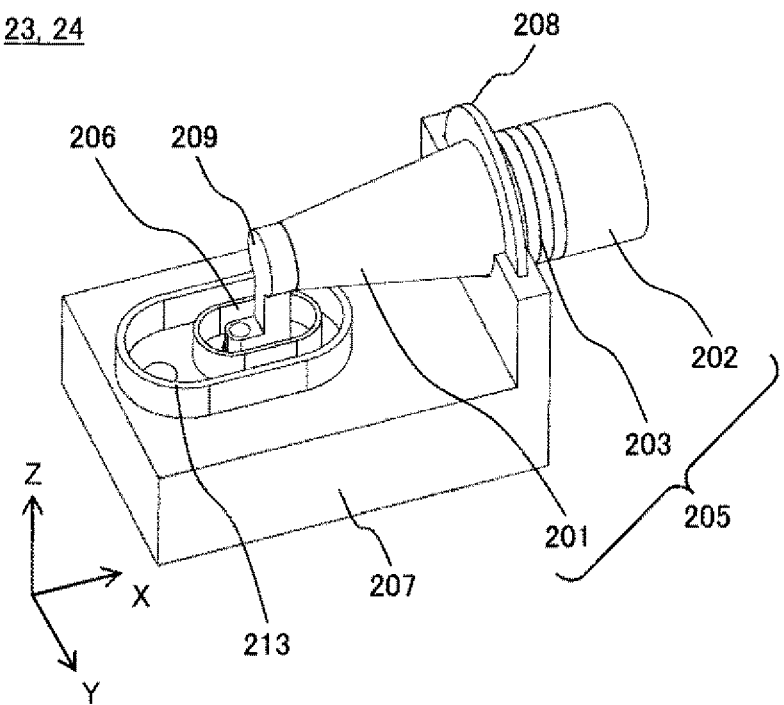
FIG. 2A is a perspective view of an ultrasonic cleaner.
Figure 2B:
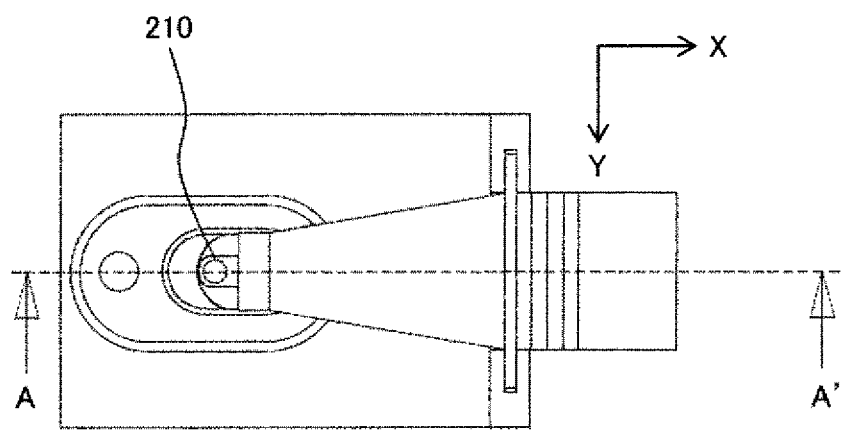
FIG. 2B is a top view of the ultrasonic cleaner.
Figure 2C:
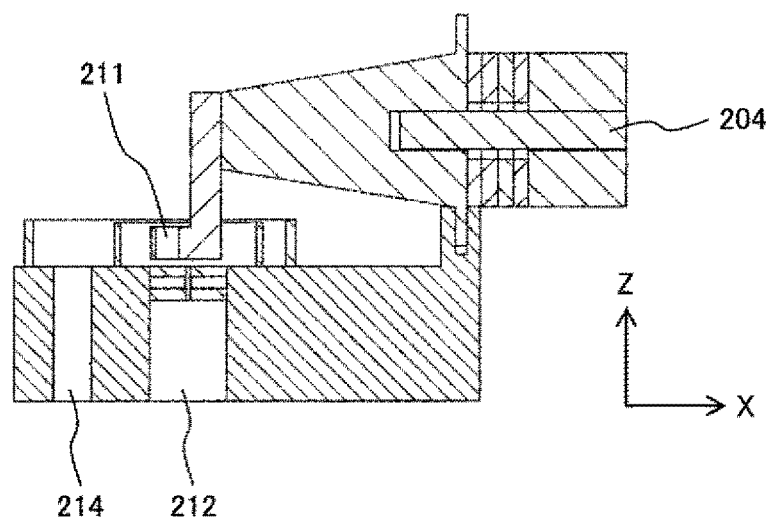
FIG. 2C is a cross-sectional view of the ultrasonic cleaner taken along a line A-A'.
Figure 2D:
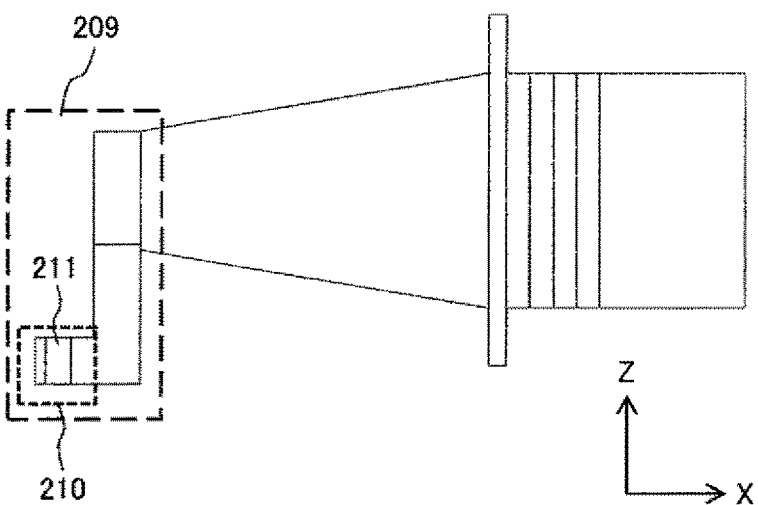
FIG. 2D is a side view of an ultrasonic transducer and a vibration head.

A structure example of the ultrasonic cleaners 23, 24 will be described referring to FIGS. 2A to 2D. FIG. 2A is a perspective view of the ultrasonic cleaner 23 or 24. FIG. 2B is a top view. FIG. 2C is a cross-sectional view taken along a line A-A' (FIG. 2B). FIG. 2D is a side view of the ultrasonic transducer and the vibration head.

Each of the ultrasonic cleaners 23, 24 includes an ultrasonic transducer (BLT: Bolt-clamped Langevin Type Transducer) 205 having one or more piezoelectric elements 203 tightened between a front mass 201 and a back mass 202 with a bolt 204, a vibration head 209, and a base portion 207 on which a cleaning tank 206 which stores the cleaning solution is disposed. In this case, an axial direction of the bolt 204 of the ultrasonic transducer 205 is designated as an X-direction, a direction perpendicular to the X-direction with respect to the top surface (horizontal plane) of the base portion 207 is designated as a Y-direction, and a direction perpendicular to the horizontal plane, that is, the vertical direction is designated as a Z-direction.

The ultrasonic transducer 205 includes a flange portion 208, and is fixed to the base portion 207. As the drawing shows, the ultrasonic transducer is fixed to the base portion 207 at the lower side of the flange portion 208. A member for fixing the flange may be provided at the upper side of the flange portion 208 so as to be connected to the base portion 207 for uniform fixation with entire circumference of the flange portion 208. It is possible to fix a part of the flange portion 208, or provide such cushion material as a rubber at a contact portion between the flange portion 208 and the base portion 207 for the purpose of preventing wear of the flange portion 208 or the base portion 207, and generation of noise.

As the flange portion 208 undergoes micro-vibration, fixation of the flange portion 208 to the base portion 207 may transmit the vibration from the flange portion 208 to the base portion 207, resulting in reduced energy to be transmitted to the vibration head 209 correspondingly. It is therefore preferable to form the flange portion 208 as a free end in the range in which the ultrasonic transducer 205 stands alone. Specifically, it is preferable to form a gap between the flange portion 208 and the base portion 207 so as to suppress transmission of the micro-vibration of the flange portion 208 to the base portion 207, and vibrate the ultrasonic transducer 205 with high efficiency.

The ultrasonic transducer 205 includes the vibration head 209 attached to a tip portion at the front mass side while being extended toward the cleaning tank 206. A tip portion 210 of the vibration head 209 has a cylindrical shape, and is positionally adjusted to be immersed in the cleaning solution stored inside the cleaning tank 206 while being not in contact with the cleaning tank 206. The cylindrical vibration head tip portion 210 has a cylindrical hole 211 larger than an outer diameter of the tip portion of the sample probe. It is possible to produce the front mass 201 and the vibration head 209 individually, and fix them with the bolt or the like. Alternatively, they may be integrally produced. The cleaning tank 206 includes a pipe 212 for supplying constant amount of the cleaning solution. Then the cleaning solution inside the cleaning tank 206 is overflown for replacement of the solution. Specifically, the cleaning solution supplied from the cleaning solution supply pipe 212 overflows from an upper end of a side wall of the cleaning tank 206, and further flows into a liquid receiver 213 at the outer periphery of the cleaning tank 206. The solution is discharged from a drainage 214 so that height (liquid level) of the cleaning solution inside the cleaning tank 206 is kept constant for each supply of the cleaning solution.

Although not shown in the drawing, an electrode (for example, a copper plate) is interposed between a metal block (201, 202) and the piezoelectric element 203, and between the piezoelectric elements 203. A sinusoidal voltage at a predetermined frequency is applied to the above-described electrode to drive the ultrasonic transducer 205 in the axial direction of the bolt 204. Especially, it has been known that the front mass 201 is formed into a horn shape (diameter at the side of the piezoelectric element 203 is changed to be different from the diameter at the vibration head side) to ensure increase in the amplitude generated by the piezoelectric element 203. The large amplitude may be obtained with less electric power by designing the length or shape of the horn in accordance with the required frequency for driving. Although the drawing shows the conical horn shape, any other shape (exponential horn) is usable without causing problems.

The long narrow vibration head 209 is attached to the tip portion of the horn-shaped front mass 201, and vibrated resonantly in synchronization with vibration of the ultrasonic transducer 205 so as to allow large displacement at the vibration head tip portion 210. This makes it possible to convert the electric energy applied to the ultrasonic transducer 205 efficiently into vibration (kinetic energy) of the vibration head tip portion 210.

When cleaning the sample probes 11a, 12a using the ultrasonic cleaners 23, 24, the piezoelectric element 203 is driven at the predetermined low frequency to insert the sample probe into the cylindrical hole 211 of the vibration head tip portion 210 so as to be immersed in a cleaning range (about 5 mm from the tip portion of the sample probe) for a predetermined time period. The stain adhered to the outer periphery of the sample probe is removed by the cavitation. After cleaning, the sample probe is pulled out from the ultrasonic cleaner to allow the cleaning solution inside the cleaning tank 206 to be overflown and replaced so that the next sample probe is cleaned with new cleaning solution while suppressing the carry-over. The above-described control is executed by the control unit 21 in accordance with the predetermined device sequence.

The ultrasonic cleaners 23, 24 drive the piezoelectric elements 203 at the frequency ranging from 20 to 100 kHz suitable for generation of the cavitation in the cleaning solution so as to vibrate the vibration head 209 resonantly inside the cleaning tank 206. The resultant largely displaced vibration (the frequency equal to the drive frequency) generates the ultrasonic vibration. Accordingly, the cavitation occurs around the vibration head 209, especially a vibration antinode (the part at the largest amplitude). The vibration head tip portion 210 as the open end corresponds to the vibration antinode. Therefore, the cavitation generated in the cylindrical hole 211 serves to intensively clean the tip portion of the sample probe. The use of water as the cleaning solution also provides high cleaning effect by the cavitation as well. For example, the use of warm water is effective for removing the protein originated stain. It is possible to use the cleaning solution adapted to the intended cleaning effect.

Figure 3A:
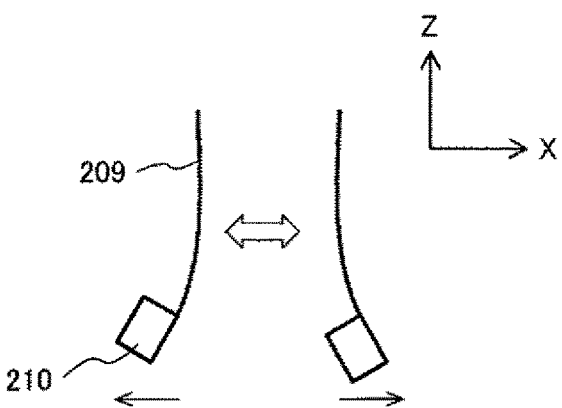
FIG. 3A is a diagram illustrating a deformation of the vibration head in a primary vibration mode.
Figure 3B:
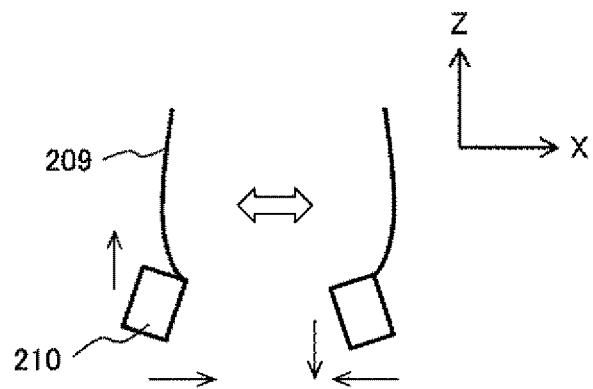
FIG. 3B is a diagram illustrating a deformation of the vibration head in a secondary vibration mode.
Figure 3C:
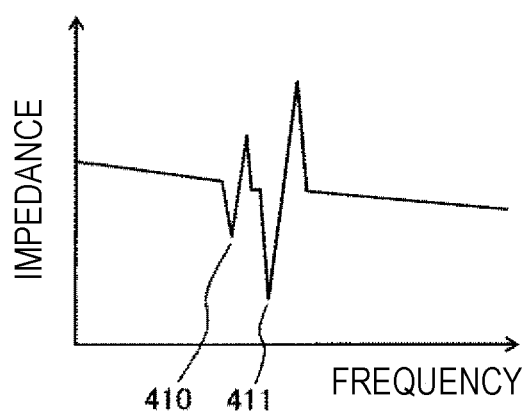
FIG. 3C is an impedance waveform of the ultrasonic transducer having the vibration head attached thereto.

An explanation will be made on vibration of the vibration head 209 referring to FIGS. 3A to 3C. The vibration head 209 includes a plurality of vibration modes in accordance with deformation accompanied by the resonant vibration. FIG. 3A shows a deformation of the vibration head 209 in a primary vibration mode. FIG. 3B shows a deformation of the vibration head 209 in a secondary vibration mode. FIG. 3C shows an impedance waveform of the ultrasonic transducer to which the vibration head is attached.

The vibration head 209 exhibits multiple types of resonant frequency, thus generating different kinds of deformation in resonance. FIG. 3A indicates the primary vibration mode in which the vibration head tip portion 210 swings in the X-direction. FIG. 3B indicates the secondary vibration mode in which the vibration head tip portion 210 swings in the X-direction, and the vibration node (the part at the smallest vibration) appears at the intermediate portion of the vibration head tip portion 210 to swing in the vertical direction (Z-direction). The drawings show the deformation exaggeratedly for the purpose of clarifying the difference in the vibration mode.

Referring to FIG. 3C, the X-axis is the frequency, and the Y-axis is the impedance, indicating a resonance point 410 of the vibration head 209, and a resonance point 411 of the ultrasonic transducer 205 (the mode in which the ultrasonic transducer 205 expands/contracts in the axial direction of the bolt 204). The resonance point 410 may be the one in the primary vibration mode, or in the secondary vibration mode. In either case, the vibration mode is used for cleaning, and the resonance frequency has to be in the range from 20 to 100 kHz at which the cavitation is likely to occur. Furthermore, it is preferable to design the vibration head 209 and the ultrasonic transducer 205 so that the resonance points 410 and 411 are adjacent to each other, and an absolute value of the difference therebetween is equal to or lower than 10 kHz for efficient conversion of the electric energy into vibration of the vibration head tip portion 210 by an interaction between the resonance points which have been brought into close to each other.

Figure 4:
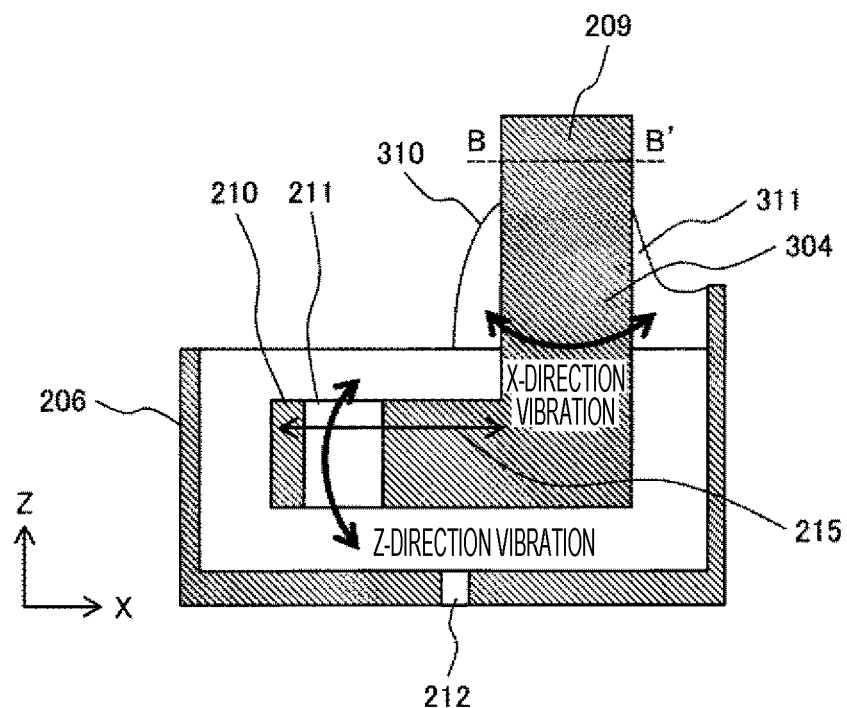
FIG. 4 is a diagram illustrating a cleaning tank and the vibration head of the ultrasonic cleaner.

FIG. 4 is a view showing the vibration head 209 and the cleaning tank 206 of the ultrasonic cleaner according to the embodiment. The vibration head 209 is vibrated at the resonance point in the secondary vibration mode while vibrating both in the X-direction and the Z-direction. As described above, the vibration head tip portion 210 is disposed in the cleaning solution inside the cleaning tank 206. The sample probe is inserted into the cylindrical hole 211 so as to be cleaned. In this way, the sample probe is cleaned by the cavitation generated around an inner wall of the cylindrical hole 211. Upon ultrasonic vibration of the vibration head 209, a rising liquid level 310 occurs around the vibration head 209, causing the level to be partially higher than an edge of the cleaning tank 206. If the cylindrical hole 211 is positioned near a neck 304 of the vibration head 209 (the part of the vibration head 209, which extends in the Z-direction between the front mass 201 and the vibration head tip portion 210), the range in which the sample probe is immersed in the cleaning solution upon cleaning is expanded from, for example, 5 mm that has been previously set to 7 mm. In the case of using the cleaning solution other than water, it is necessary to execute the water washing process to the cleaned portion of the sample probe for washing out the cleaning solution. The cleaning range has to be expanded in the above-described water washing process. Expansion of the cleaning range may cause problems of deteriorating the throughput, and making water easily retained in the sample probe, resulting in dilution of the sample. Accordingly, it is preferable to set a head tip length 215 to the value that allows the cylindrical hole 211 to be apart from the neck 304 of the vibration head 209 so that the sample probe is not in contact with the rising liquid level 310.

Figure 5A:
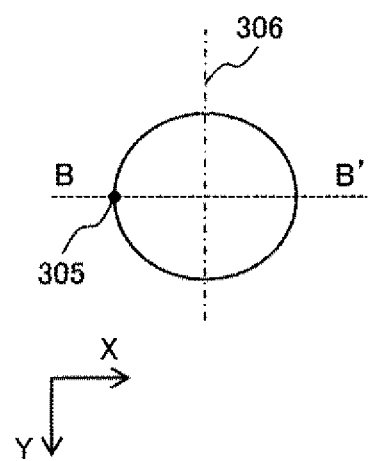
FIG. 5A is an example of a cross-section of a neck of the vibration head.
Figure 5B:
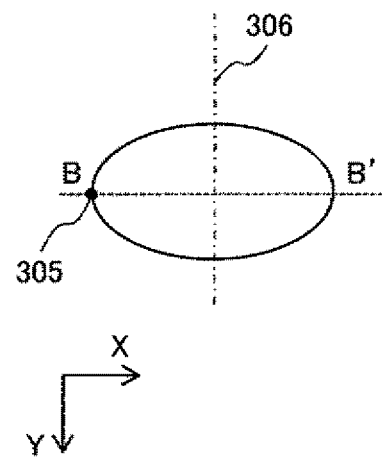
FIG. 5B is an example of a cross-section of a neck of the vibration head.
Figure 5C:
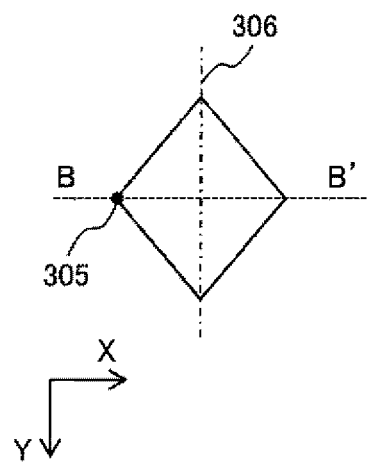
FIG. 5C is an example of a cross-section of a neck of the vibration head.
Figure 5D:
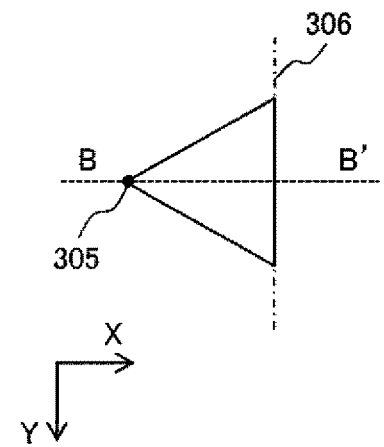
FIG. 5D is an example of a cross-section of a neck of the vibration head.

The rising liquid level 310 of the cleaning solution is more likely to occur as its plane in the direction perpendicular to the vibrating direction becomes larger. It is possible to suppress the rising liquid level of the cleaning solution by forming the cross-section of the neck 304 taken along a line B-B' into a circular shape (FIG. 5A), an elliptical shape having the longitudinal axis aligned with the X-direction (FIG. 5B), a rhombic shape having one diagonal line aligned with the X-direction (FIG. 5C), or an isosceles triangle shape having the straight line for connecting the base and the vertex aligned with the X-direction (FIG. 5D). Each of the above-described shapes is set so that a YZ cross-section of the neck 304 (that is, the plane perpendicular to the vibrating direction (X-direction in this case)) is sequentially increased from an end 305 at the side of the vibration head tip portion 210, which is the smallest in size to a plane 306 in which the YZ cross-section is the largest in size. Arbitrary cross-section shape other than those shown in FIGS. 5A to 5D is effective for suppressing the rising liquid level so long as it exhibits the similar feature.

The rising liquid level of the cleaning solution occurs with respect to the X-direction. Contact of the rising cleaning solution with the cleaning tank 206 may cause the risk of overflow of the cleaning solution outside the cleaning tank 206. If there is a part where the liquid level of the cleaning solution becomes lower than the upper end of the side wall of the cleaning tank 206, contact of a rising liquid level 311 with the side wall will pull the neck 304 by the surface tension of the cleaning solution, leading to displacement of the neck 304, that is, vibration amplitude deterioration. Therefore, the distance between the cleaning tank 206 and the neck 304 of the vibration head 209 has to be greater than the rising liquid level of the cleaning solution.

The above-described phenomenon of the cleaning solution rising may evaporate moisture of the cleaning solution adhered to the neck 304, resulting in precipitation of the component. The above-described problem and the measure to be taken will be described referring to FIGS. 6 and 7.

Figure 6:
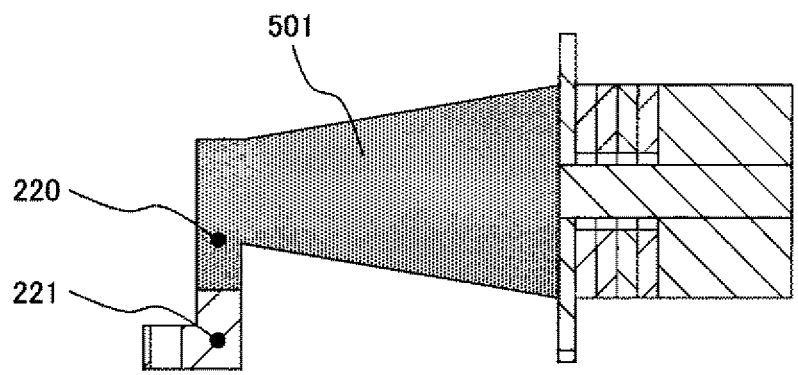
FIG. 6 is an example of a coating of the vibration head and the ultrasonic transducer.

In the primary vibration mode as shown in FIG. 3A, the vibration antinode (the part at the largest amplitude) appears at a tip portion 221 of the vibration head 209 as shown in FIG. 6. The vibration node (the part at the smallest amplitude) appears at a proximal portion 220 (a connection portion between the vibration head 209 and the ultrasonic transducer 205) of the neck 304. The phenomenon of the rising cleaning solution which has been caused by the vibration of the vibration head tip portion 210 allows the cleaning solution to reach the vibration node 220 at the small amplitude. In the case that the cleaning solution is likely to be precipitated upon evaporation, the cleaning solution which has reached the vibration node 220 undergoes precipitation phenomenon at the interface with an atmosphere layer. Precipitation of the cleaning solution makes the displacement around the vibration antinode 221 large. It is therefore possible to exfoliate the precipitated substance from the neck 304. However, it is difficult to exfoliate the precipitated cleaning solution from around the vibration node 220 at the small amplitude. This may make the precipitated substance swollen with the lapse of time.

Adhesion of the precipitated cleaning solution is prevented by applying a hydrophobic or hydrophilic coating film 501 at least to the node 220. For example, the coating film such as a fluoroplastic resin film is applied to the area around the portion to be formed as the node 220. The hydrophobic coating is used to make the cleaning solution hardly remained so as to prevent the precipitation. The hydrophilic coating is used to thinly spread the cleaning solution so as to prevent the precipitation. As FIG. 6 shows, a coating interface exists between the vibration node 220 and the vibration antinode 221 in the range of the coating film 501 so as to coat the region at the side of the vibration node 220. In the case of coating the vibration antinode 221 as well, the coating film 501 may be exfoliated owing to the large amplitude of the vibration head 209, which is not suitable for the long-term use. The region at the side of the vibration node 220 may be coated by applying the coating film up to the vibration head 209, or the front mass 201 entirely.

Figure 7:
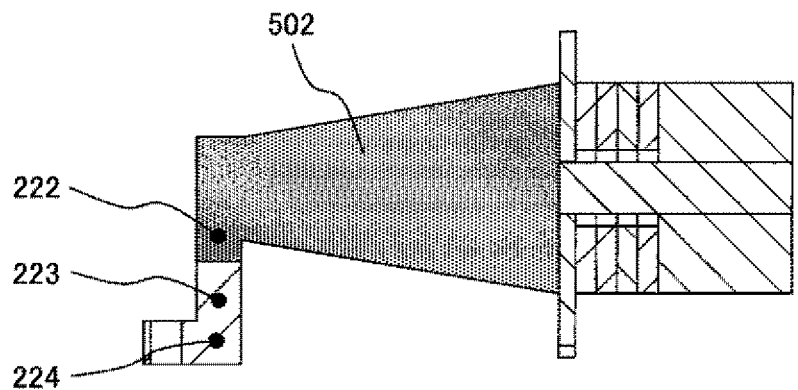
FIG. 7 is an example of a coating of the vibration head and the ultrasonic transducer.

In the secondary vibration mode as shown in FIG. 3B, the vibration antinode (the part at the largest amplitude) appears at an intermediate portion 223 of the vibration head 209 as shown in FIG. 7. A first vibration node (the part at the smallest amplitude) appears at a proximal portion 222 (a connection portion between the vibration head 209 and the ultrasonic transducer 205). A second vibration node appears at a tip portion 224 of the vibration head 209. The phenomenon of the rising liquid level of the cleaning solution caused by vibration of the vibration head tip portion 210 allows the cleaning solution to reach the vibration node 222 at the small amplitude. In the case that the cleaning solution is likely to be precipitated upon evaporation, the cleaning solution which has reached the vibration node 222 undergoes the precipitation phenomenon at the interface with the atmosphere layer. Precipitation of the cleaning solution makes the displacement around the vibration antinode 223 large. It is therefore possible to exfoliate the precipitated substance from the neck 304. However, it is difficult to exfoliate the precipitated cleaning solution from around the vibration node 222 at the small amplitude. This may make the precipitated substance swollen with the lapse of time.

Adhesion of the precipitated cleaning solution is prevented by applying a hydrophobic or hydrophilic coating film 502 at least to the first node 222. For example, the coating film such as the fluoroplastic resin film is applied to the area around the portion to be formed as the first node 222. As FIG. 7 shows, a coating interface exists between the first vibration node 222 and the vibration antinode 223 in the range of the coating film 502 so as to coat the region at the side of the first vibration node 222. In the case of coating the vibration antinode 223 as well, the coating film 502 may be exfoliated owing to the large amplitude of the vibration head 209, which is not suitable for the long-term use. The region at the side of the first vibration node 222 may be coated by applying the coating film up to the vibration head 209, or the front mass 201 entirely.

The embodiment has been described by taking the sample dispensing performed in the biochemical automatic analyzer as an example. However, the ultrasonic cleaner according to the present invention allows cleaning of the dispensing nozzle of any other clinical examination device, the ISE (ion selective electrode) probe, for example, the sample dispensing probe and the dispensing probe of the automatic immunological analyzer.

EXPLANATIONS OF LETTERS OR NUMERALS

1: reaction disk, 2: reaction container, 3: cleaning mechanism, 4: spectrophotometer, 5: stirring mechanism, 6: stirring mechanism, 7: reagent dispensing mechanism, 8: reagent dispensing mechanism, 7a: reagent probe, 8a: reagent probe, 9: reagent disk, 10: reagent bottle, 11: reagent dispensing mechanism, 12: sample dispensing mechanism, 11a: sample probe, 12a: sample probe, 13: sample probe cleaning tank, 14: sample probe cleaning tank, 15: sample container, 16: sample rack, 17: sample transfer mechanism, 18: reagent pump, 19: sample pump, 20: cleaning pump, 21: control unit, 23: ultrasonic cleaner, 24: ultrasonic cleaner, 30: stirring mechanism cleaning tank, 31: stirring mechanism cleaning tank, 32: reagent probe cleaning tank, 33: reagent probe cleaning tank, 100: automatic analyzer, 201: front mass, 202: back mass, 203: piezoelectric element, 204: bolt, 205: ultrasonic transducer (BLT), 206: cleaning tank, 207: base portion, 208: flange portion, 209: vibration head, 210: vibration head tip portion, 211: cylindrical hole, 212: cleaning liquid supply pipe, 213: liquid receiver, 214: drainage, 215: head tip length, 220: vibration node in primary vibration mode, 221: vibration antinode in primary vibration mode, 222: first vibration node in secondary vibration mode, 223: vibration antinode in secondary vibration mode, 224: second vibration node in secondary vibration mode, 304: neck of vibration head, 305: end of neck, 306: surface having maximal YZ cross-section of neck, 310: cleaning solution raiser, 311: cleaning solution raiser, 410: resonance point of vibration head, 411: resonance point of ultrasonic transducer, 501: coating film, 502: coating film.

The invention claimed is:
1. An ultrasonic cleaner comprising:
a cleaning tank which is configured to store a cleaning solution;
an ultrasonic transducer; and
a vibration head which extends from the ultrasonic transducer toward the cleaning tank and of which a tip portion includes a cylindrical hole having a longitudinal direction aligned to a vertical direction,
wherein the ultrasonic transducer is configured to be driven at a frequency at which the vibration head is vibrated resonantly, and
wherein the vibration head is provided with a hydrophobic or hydrophilic coating film which covers an area corresponding to a vibration node but does not cover an area corresponding to a vibration antinode when the ultrasonic transducer is driven at the resonant vibration frequency of the vibration head, so that the coating film has an interface between an area corresponding to the vibration antinode and an area corresponding to the vibration node.

2. The ultrasonic cleaner according to claim 1,
wherein the ultrasonic transducer is configured to be driven at a frequency at which the vibration head is driven resonantly in a vibration mode accompanied by a deformation in a direction perpendicular to the longitudinal direction of the cylindrical hole, and
wherein when the vibration head is vibrated resonantly, the vibration node is configured to appear at a connection portion between the vibration head and the ultrasonic transducer and the vibration antinode is configured to appear at the tip portion of the vibration head.

3. The ultrasonic cleaner according to claim 1,
wherein the ultrasonic transducer is configured to be driven at a frequency at which the vibration head is vibrated resonantly in a vibration mode accompanied by a deformation in the longitudinal direction of the cylindrical hole and a direction perpendicular to the longitudinal direction,
wherein when the vibration head is vibrated resonantly, the vibration node is configured to appear such that a first vibration node appears at a connection portion between the vibration head and the ultrasonic transducer and a second vibration node appears at the tip portion of the vibration head and the vibration antinode appears at an intermediate portion of the vibration head, and
wherein the coating film has the interface from an intermediate portion of the vibration head corresponding to the vibration antinode during the resonant vibration of the vibration head to a connection portion between the vibration head corresponding to the first vibration node and the ultrasonic transducer and covers the connection portion between the vibration head corresponding to the first vibration node and the ultrasonic transducer.

4. The ultrasonic cleaner according to claim 1,
wherein the coating film is a fluororesin film.

5. The ultrasonic cleaner according to claim 1,
wherein the ultrasonic transducer includes a front mass, a back mass, a piezoelectric element, and a bolt which is configured to tighten the piezoelectric element between the front mass and the back mass,
wherein the vibration head is connected to the front mass, and
wherein the front mass is provided with the coating film.

6. The ultrasonic cleaner according to claim 1,
wherein a cross-section of the vibration head in a plane perpendicular to the longitudinal direction of the cylindrical hole has a shape which sequentially increases in size to a plane in which the cross-section becomes the largest while the cross-section is the smallest at an end provided with the cylindrical hole of the vibration head.

7. The ultrasonic cleaner according to claim 1,
wherein a distance between a side wall of the cleaning tank and the vibration head is larger than a distance of a rising liquid level in the cleaning tank during the resonant vibration of the vibration head.

8. The ultrasonic cleaner according to claim 1, further comprising:
a base portion on which the cleaning tank and the ultrasonic transducer are disposed,
wherein the ultrasonic transducer includes a front mass including a flange portion, a back mass, a piezoelectric element, and a bolt which is configured to tighten the piezoelectric element between the front mass and the back mass,
wherein the ultrasonic transducer is fixed to the base portion of the flange portion, and wherein a gap is formed between the flange portion and the base portion and the flange portion is formed as a free end in the range in which the ultrasonic transducer stands alone.

9. The ultrasonic cleaner according claim 8, wherein a cushion material is provided between the flange portion and the base portion.

10. An automatic analyzer comprising:

the ultrasonic cleaner according to claim 1;

a sample dispensing mechanism which includes a sample probe for sucking a sample; and a control unit which is configured to control the ultrasonic cleaner and the sample dispensing mechanism, wherein the control unit is configured to clean the sample probe by inserting the sample probe into the cylindrical hole of the vibration head of the ultrasonic cleaner and driving the ultrasonic transducer of the ultrasonic cleaner at the frequency.

* * * * *